Dec. 17, 1957     E. D. PALMER     2,816,446
WHEEL BALANCER FOR AUTOMOBILE WHEELS
Filed Sept. 16, 1955
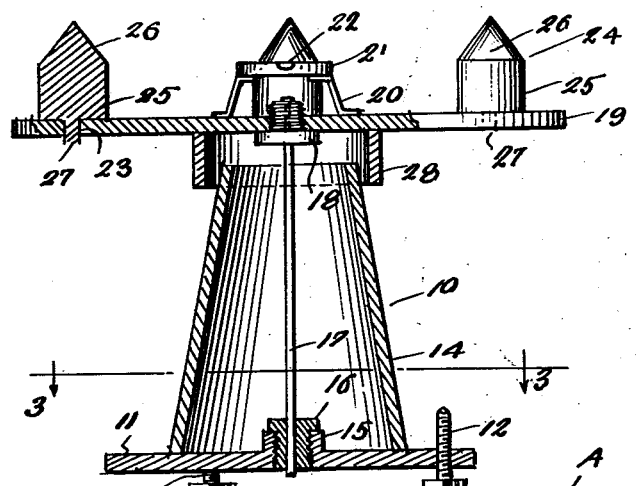
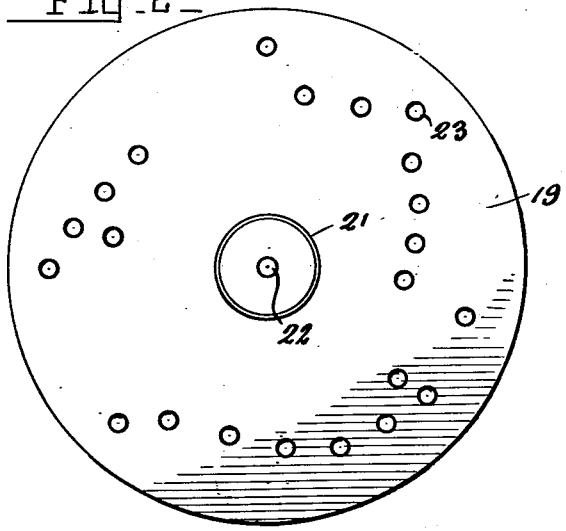
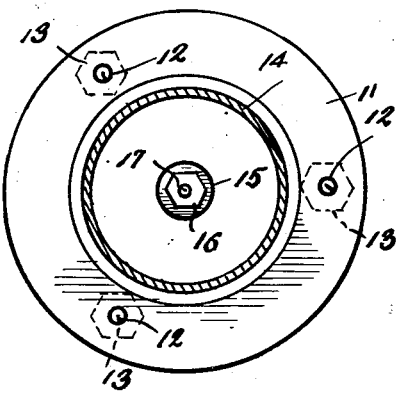
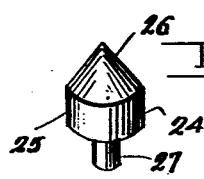
INVENTOR.
ELMER DAVID PALMER
BY
*Patrick D. Beavers*
ATTORNEY

United States Patent Office 2,816,446
Patented Dec. 17, 1957

2,816,446

WHEEL BALANCER FOR AUTOMOBILE WHEELS

Elmer David Palmer, North Richland, Wash., assignor of forty-nine percent to Float-O-Matic Mfg. Company, Coeur d'Alene, Idaho, a corporation of Idaho, and fifty-one percent to V. J. Philippi Application September 16, 1955, Serial No. 534,843

1 Claim. (Cl. 73—483)

This invention relates to improvements in wheel balancers for wheels of motor vehicles.

An important object of this invention is to provide a portable wheel balancer that may be easily transported in all types of automobiles.

Another object of the invention is to provide an inexpensive wheel balancer that is efficient in operation yet simple in construction.

There are many expensive and complicated types of wheel balancers that are available only in tire shops or garages. If a person desires to have the wheels of his automobile balanced he must visit such establishments because, without such equipment he could not balance the wheels himself.

However, with the wheel balancer embodying the invention, a service station or an individual may own or use the wheel balancer without undue expense because of the inexpensive and simple construction of the wheel balancer.

With the above and other objects and advantages in view, the invention consists of the novel details of construction, arrangement and combination of parts more fully hereinafter described, claimed and illustrated in the accompanying drawing in which:

Fig. 1 is a vertical sectional view, partly in elevation, of a wheel balancer embodying the invention;

Fig. 2 is a top plan view of Fig. 1;

Fig. 3 is a transverse sectional view on the line 3—3 of Fig. 1; and

Fig. 4 is a perspective view of a wheel centering point.

Referring more in detail to the drawing, wherein like parts are designated by like reference numerals the reference numeral 10 generally designates a wheel balancer embodying the invention.

The wheel balancer 10 comprises a circular platform 11 which is provided with three leveling screws 12. The screws 12 have large heads 13 that are placed on a horizontal surface A.

A truncated conical shaped stand 14 is mounted on the platform 11 in vertical relation thereto centrally thereof.

The platform 11 is provided at the center thereof with an internally threaded projection 15 in which is threaded a split fastener 16.

The split fastener 16 receives the lower end of a spring steel rod 17 and the upper end of the spring steel rod 17 is received in a split fastener 18. The fastener 18 is threadably mounted in the center of the circular floating or balancing table 19 and brackets 20 mount a spirit level 21 having a bubble 22 therein at the center of the table 19 immediately above the fastener 18.

The table 19 has twenty-two relatively spaced openings 23 therein. The openings are so grouped that they will underlie the lug receiving openings in any type or size of automobile wheel.

In Fig. 4 a wheel centering point 24 is shown which comprises a circular body 25 provided at one end with a conical shaped tip 26 and at the opposite end with an integral reduced pin portion 27 which is located centrally upon that end of the body 25.

In order that the spring rod 17 will not unnecessarily bend when a wheel is placed on the table 19, a circular flange 28 is secured to the bottom surface of the table 19 and the lower peripheral edge of the flange 28 terminates below the level of the upper peripheral edge of the stand 14.

When an automobile wheel is to be balanced the wheel balancer is positioned on the surface A and the screws 12 are adjusted until the bubble 22 is in the exact center of the spirit level 21. After the table 19 is level the wheel centering points are mounted by means of the pin portion 27 on the table 19. The wheel centering points are positioned so that they will enter the lug receiving openings in the automobile wheel that is to be balanced. The peculiar arrangement of the openings 23 permit wheels of various sizes and types to be mounted centrally of the table 19.

Since the steel rod 17 permits the table 19 to float, the uneven weight of the wheel will cause the table to tilt downward at the heaviest portion of the wheel.

The balancing weight can then be placed on the high side of the wheel. Thus weights are applied to the wheel until the bubble 22 remains in the center of the spirit level 21. When this has been accomplished the automobile wheel is perfectly balanced.

There has thus been provided a wheel balancer that will carry out the object of the invention and it is believed that the construction and operation of the wheel balancer will be apparent to those skilled in the art.

It is also to be understood that changes in the minor details of construction, arrangement and combination of parts may be resorted to provided they fall within the spirit of the invention and the scope of the appended claim.

Having thus described the invention what is claimed as new and desired to be secured by Letters Patent is:

A wheel balancer comprising a platform, leveling screws carried by said platform, a spring steel rod secured to the center of the platform in vertical relation thereto, a table mounted on the upper end portion of said rod, relatively spaced openings in said table, and wheel supporting means selectively received in said openings.

References Cited in the file of this patent

UNITED STATES PATENTS

| | | |
|---|---|---|
| 1,091,708 | Riddell | Mar. 31, 1914 |
| 2,176,269 | Morse | Oct. 17, 1939 |
| 2,349,288 | Lannen | May 23, 1944 |
| 2,600,888 | Lannen | June 17, 1952 |
| 2,647,398 | Marvel | Aug. 4, 1953 |